(12) United States Patent
Howard

(10) Patent No.: US 7,506,449 B2
(45) Date of Patent: Mar. 24, 2009

(54) MEASUREMENT DEVICE

(75) Inventor: Douglas Allen Howard, Reston, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 294 days.

(21) Appl. No.: 11/461,028

(22) Filed: Jul. 31, 2006

(65) Prior Publication Data
US 2007/0028468 A1 Feb. 8, 2007

Related U.S. Application Data

(60) Provisional application No. 60/706,040, filed on Aug. 8, 2005.

(51) Int. Cl.
*G01C 17/34* (2006.01)

(52) U.S. Cl. .............................. 33/268; 33/270; 33/1 SA

(58) Field of Classification Search .................... 33/268, 33/269, 270, 1 SA, 1 SC
See application file for complete search history.

(56) References Cited

U.S. PATENT DOCUMENTS

| 2,443,240 | A | * | 6/1948 | Hagner | 33/269 |
| 2,762,123 | A | * | 9/1956 | Schultz et al. | 33/1 SA |
| 3,613,249 | A | * | 10/1971 | Evenson | 33/268 |
| 4,136,397 | A | * | 1/1979 | Pierce | 33/269 |
| 4,457,296 | A | * | 7/1984 | Klann | 33/269 |

* cited by examiner

Primary Examiner—Yaritza Guadalupe-McCall
(74) Attorney, Agent, or Firm—David Grossman

(57) ABSTRACT

A measurement device comprising a horizontal track, at least one self-leveling foot coupled to the horizontal track, a hemispherical track coupled to the horizontal track, a movable sensor unit coupled to the hemispherical track, and a connector disposed on the hemispherical track for taking measurements on the ground.

20 Claims, 6 Drawing Sheets

MEASUREMENT DEVICE

CROSS-REFERENCES TO RELATED APPLICATIONS

This application claims the benefit of U.S. Provisional Application No. 60/706,040, to Howard, filed Aug. 8, 2005, and entitled "Thermal Exitance and Bidirectional Reflectance Goniometer," which is hereby incorporated in whole by reference.

BRIEF DESCRIPTION OF THE DRAWINGS

Embodiments of the present invention will now be described by way of example with reference to the accompanying drawings, in which.

DETAILED DESCRIPTION OF EMBODIMENTS

In one embodiment, a tracking device is provided for making measurements from a ground perspective that may be correlated to similar measurements made from a distance by a remote sensor. Such measurements may be used to understand measurements taken by the remote sensor.

Figure 1:
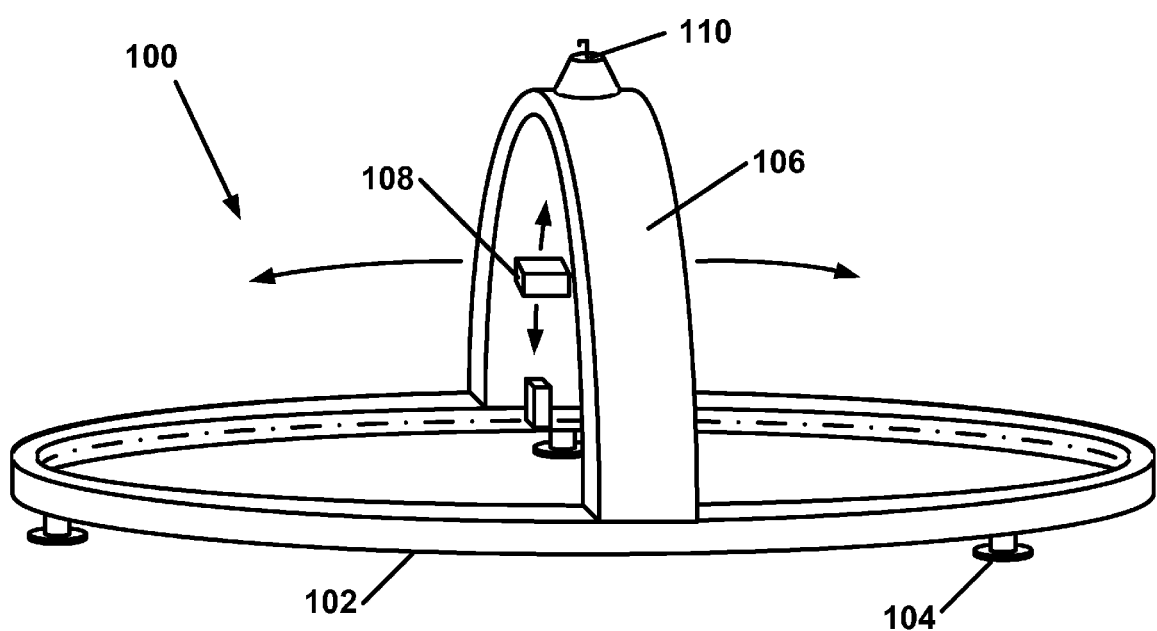
FIG. 1 depicts an embodiment of a measurement device from a perspective view.

FIG. 1 shows an illustrative measurement device 100 for collecting data. The measurement device 100 has a horizontal track 102. The horizontal track 102 may be constructed from any suitable metal or other rigid material. Coupled to the horizontal track 102 is at least one self-leveling foot 104. The at least one self-leveling foot 104 should ensure that the horizontal track 102 is level. The at least one self-leveling foot 104 may perform its leveling function using mechanisms (or combinations of mechanisms) such as self-leveling mechanics, motors, hydraulics, level processing or other method known in the field. The leveling mechanism may need to work in conjunction with a controller using a separate feedback mechanism to determine when the structure is level.

A hemispherical track 106 is disposed on the horizontal track 102. The hemispherical track 106 may fit within a groove in the horizontal track 102. Alternatively, the hemispherical track 106 may be disposed on the horizontal track 102 in another way such that the hemispherical track 106 can rotate around the horizontal track 102. The hemispherical track 106 and the horizontal track 102 may be manufactured using fairly rigid materials such as aluminum, steel, carbon composites and the like.

A movable sensor unit 108 is coupled to the hemispherical track 106. The movable sensor unit 108 is configured to move along the inner face of the hemispherical track 106. Additionally, the movable sensor unit 108 may fix itself in positions along the inner face of the horizontal track 106. Thus, the movable sensor unit 108 may reach a variety of positions by rotating the hemispherical track 106 around the horizontal track 102 and moving the movable sensor unit 108. This should allow the measurement device 100 to collect data from a variety of angles. The movable sensor unit 108 may be used to collect data such as directional thermal exitance, reflectance, or the like.

A connector device 110 is disposed on the hemispherical track 106. The connector device 110 may be used as a grab point in order to provide a rigid location by which the measurement device 100 may be moved without causing damage. Additionally, the connector device 110 may be used as a communications mechanism in order for the measurement device 100 to communicate with an external device. Also, the connector device 110 may be used as a power mechanism which transmits power from an external device.

Figure 2A:
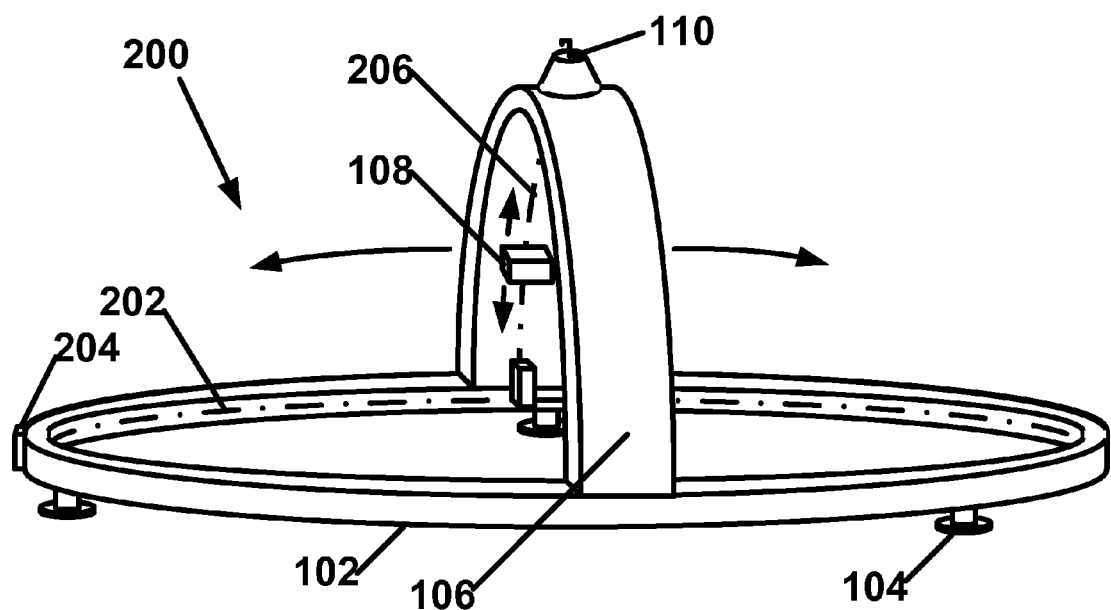
FIG. 2A depicts another embodiment of a measurement device from a perspective view.

FIG. 2A shows another illustrative embodiment. The measurement device 200 depicted in FIG. 2A comprises a horizontal track 102. A horizontal track guide bar 202 is disposed on the horizontal track 102. A motor 204 is configured to rotate the horizontal track guide bar 202 along the horizontal track 102. A hemispherical track 106 is disposed on the horizontal track guide bar 202. When the motor 204 rotates the horizontal track guide bar 202, the hemispherical track 106 is rotated as well. Although the motor 204 is depicted as located outside the horizontal track guide bar 202, one of ordinary skill in the art would understand that the motor 204 could be located inside the horizontal track guide bar 202, or in any other location such that the motor 204 can rotate the horizontal track guide bar 202.

A hemispherical track guide bar 206 is disposed on the hemispherical track 106. A moveable sensor unit 108 is coupled to the hemispherical track guide bar 206. The movable sensor unit 108 is free to move along the length of the hemispherical track guide bar 206. Additionally, the movable sensor unit 108 may be configured to stop for a period of time at locations along the length of the hemispherical track guide bar 206. In an alternate embodiment, the movable sensor unit 108 may be configured to move on the outside of the hemispherical track guide bar 206. This may allow the measurement device 200 to collect data from an extended field.

Figure 2B:
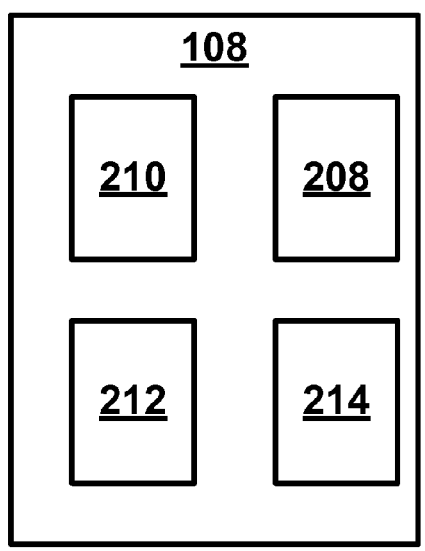
FIG. 2B depicts an illustrative movable sensor unit as per an aspect of an embodiment of the present invention.

FIG. 2B depicts the components contained in the movable sensor unit 108. The movable sensor unit 108 may be comprised of a sensor head 208, a sensor angle measurement device 210, a sensor head drive motor 212, and a storage device 214 which stores data. The sensor head 208 may be an optical unit which takes measurements such as a thermal exitance spectral sensor or bidirectional reflectance sensor. The sensor angle measurement device 210 preferably determines the correct positioning for the sensor head 208. The sensor head drive motor 212 should be configured to position the sensor head 208 to desired positions. The sensor head drive motor 212 may be located within the movable sensor unit 108 or it may be located exterior to the movable sensor unit 108. Additionally, a storage device 214 may store measurement data taken by the sensor head 208. The storage device 214 may also be located within the movable sensor unit 108 or it may be located exterior to the movable sensor unit 108

With reference to FIG. 2A again, a connector device 110 may be disposed on the hemispherical track 106. The connector device 110 may be used as a grab point in order to provide a rigid location by which the measurement device 200 may be moved without causing damage. Additionally, the connector device 110 may be used as a communications mechanism in order for the measurement device 200 to communicate with an external device. Also, the connector device 110 may be used as a power mechanism which transmits power from an external device. The connector device 110 can be located on top of the hemispherical track 106, or any other location that allows an external device to reach the measurement device 200.

At least one self-leveling foot 104 should be coupled to the horizontal track 102. It is understood that any number of self-leveling feet 104 may be used in order to level the measurement device 200.

Figure 3:
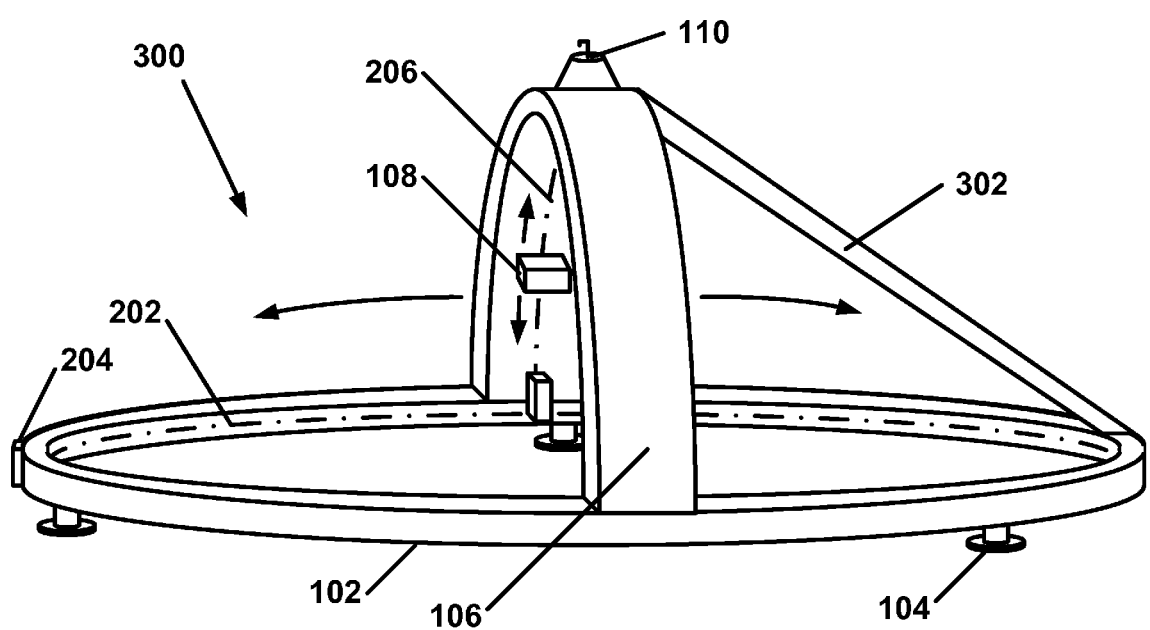
FIG. 3 depicts another embodiment of a measurement device from a perspective view.
Figure 4:
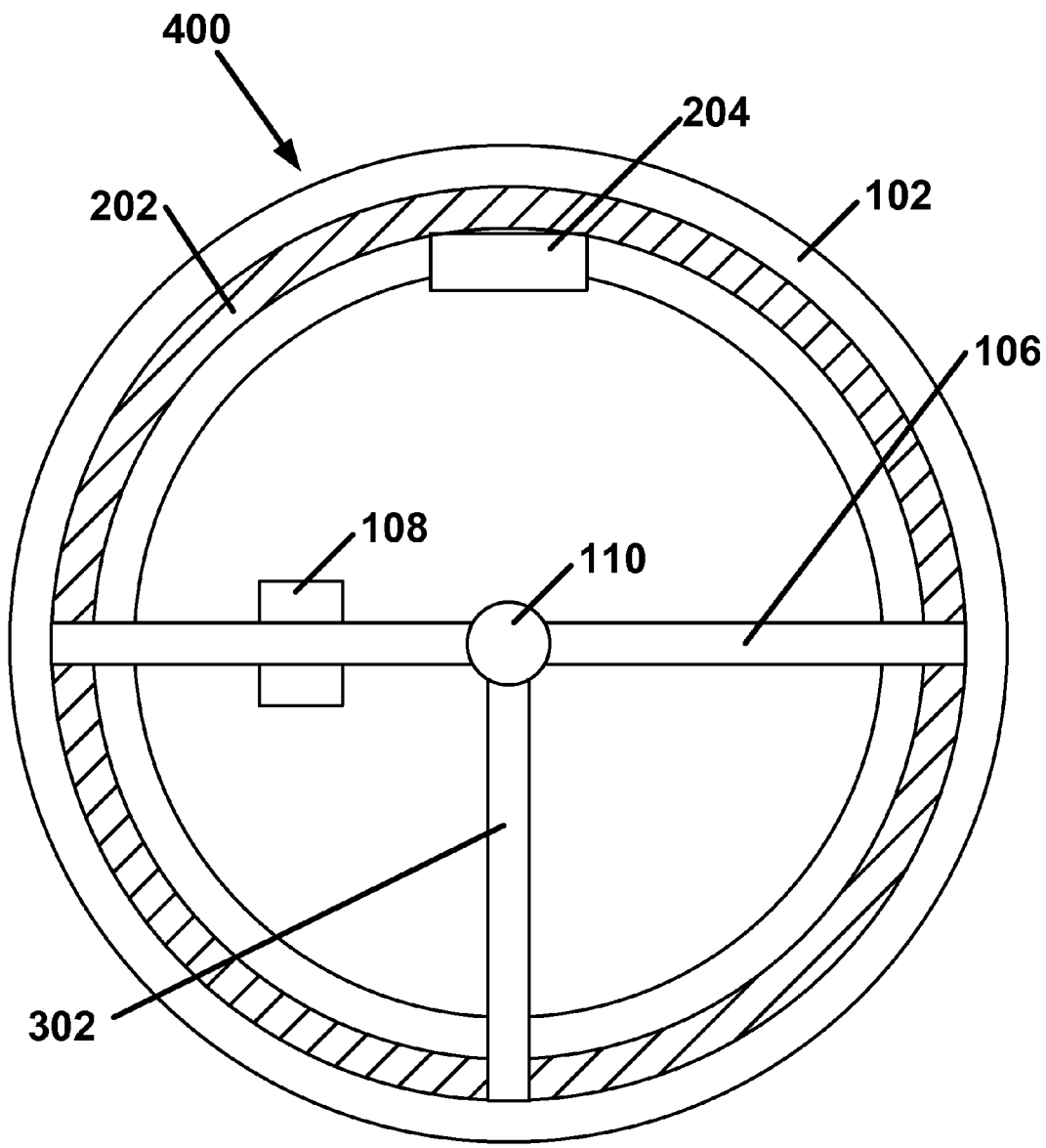
FIG. 4 depicts the embodiment of FIG. 3 from a top view.

FIGS. 3 and 4 show the illustrative embodiment described with respect to FIG. 2A with the addition of a stabilizer bar 302. The stabilizer bar 302 may be coupled to the horizontal track guide bar 202 and the hemispherical track 106. The stabilizer bar 302 provides rigidity to the measurement device 300. The stabilizer bar 302 may be made out of relatively strong material such as metal, plastic, composites, or the like. The final environment that the unit will operate in may set additional requirements for the material. For example, if the device is intended for space flight, the material may need to be strong, light weight and able to withstand large fluctuations in temperature. Alternatively, the stabilizer bar 302 may be coupled to the horizontal track 102. Alternatively, the stabilizer bar 302 may be coupled to the hemispherical track guide bar 206 or the connector device 110 or any combination thereof.

Figure 5:
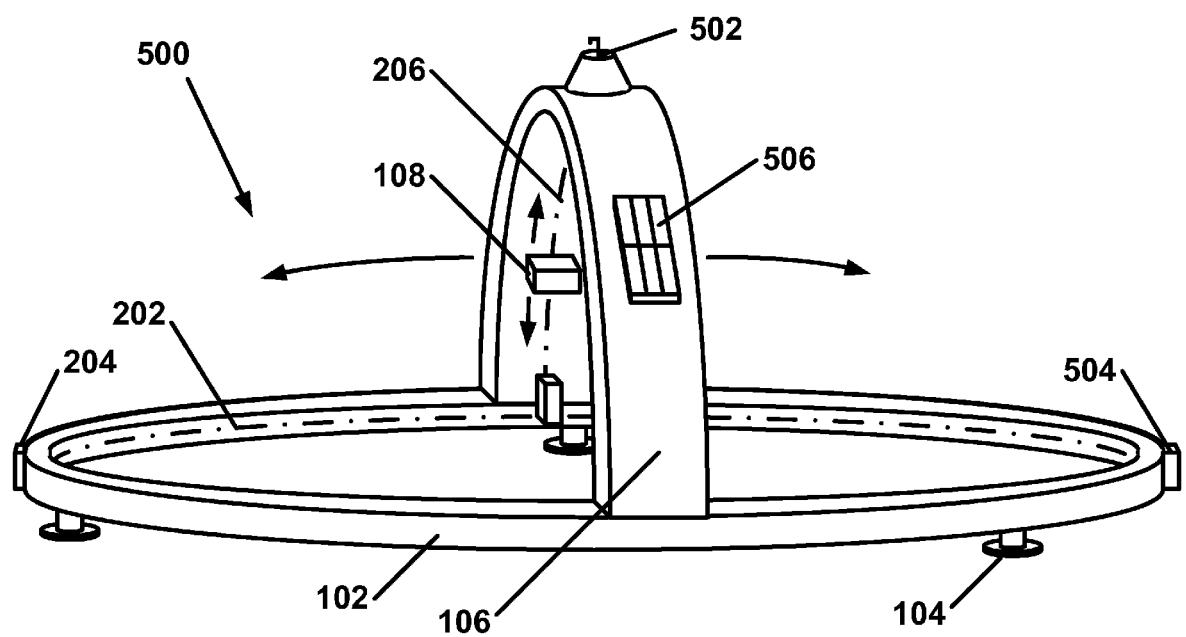
FIG. 5 depicts another embodiment of a measurement device from a perspective view.

FIG. 5 shows another illustrative embodiment. In this embodiment, the measurement device 500 is self-sustaining. The measurement device 500 depicted in FIG. 5 comprises a horizontal track 102. A horizontal track guide bar 202 is disposed on the horizontal track 102. A motor 204 is configured to rotate the horizontal track guide bar 202 along the horizontal track 102. A hemispherical track 106 is disposed on the horizontal track guide bar 202. When the motor 204 rotates the horizontal track guide bar 202, the hemispherical track 106 should be rotated as well.

A hemispherical track guide bar 206 is disposed on the hemispherical track 106. A moveable sensor unit 108 is coupled to the hemispherical track guide bar 206. The movable sensor unit 108 is configured to move along the length of the hemispherical track guide bar 206. Additionally, the movable sensor unit 108 may stop itself for periods of time along the length of the hemispherical track guide bar 206.

A connector device 502 is disposed on the hemispherical track 106. The connector device 502 may be used as a grab point in order to provide a rigid location by which the measurement device 500 may be moved without causing damage.

At least one self-leveling foot 104 is coupled to the horizontal track 102. It is understood that any number of self-leveling feet 104 may be used in order to level the measurement device 500.

A transmitter 504 is coupled to the horizontal track 102. It is understood that the transmitter 504 may be located elsewhere on the measurement device 500. The transmitter 504 should be configured to transmit data to an external device via a wireless transmission. Additionally, the transmitter 504 may receive data from an external device via a wireless transmission.

In order for the measurement device 500 to be self-sustaining, the measurement device 500 may be powered by solar panels, or any self-contained power source. The self-contained power source, along with the transmitter 504, allows the measurement device 500 to be used at a location without assistance for an extended time.

A sun seeker 506 may be located on the measurement device 500. The sun seeker 506 is well known in the field and should be configured to assist the measurement device 500 to locate the sun.

Figure 6:
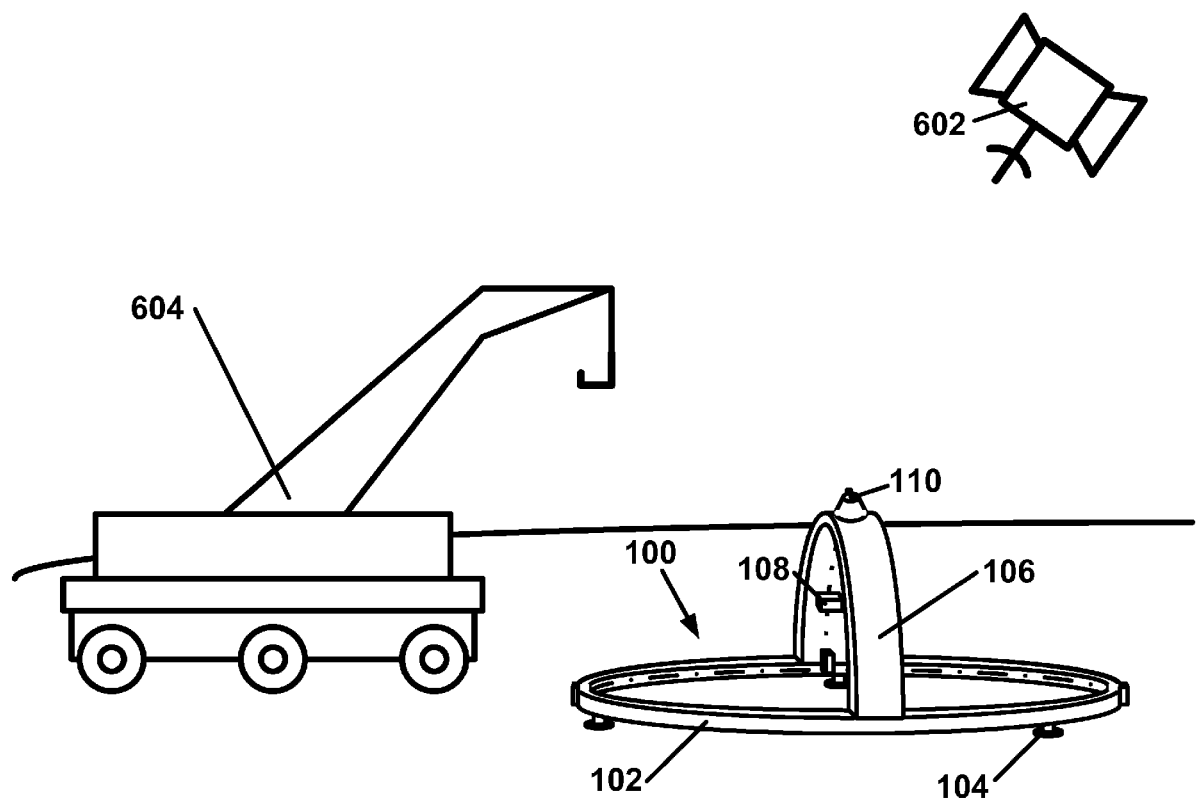
FIG. 6 depicts the embodiment of FIG. 2A in an application from a perspective view.

FIG. 6 depicts an illustrative embodiment in operation. The measurement device 200 described with respect to FIG. 2A is being used in conjunction with a satellite 602. In the illustration, the measurement device 200 is configured to track the orbit of a satellite 602. During this satellite tracking maneuver, both the satellite 602 and the measurement device 200 preferably take corresponding measurements. The measurement device 200 may receive the set of coordinates to follow via the connector device 110.

Based on these coordinates, the motor 204 should rotate the horizontal track guide bar 202 in order to correctly position the hemispherical track 106. The movable sensor unit 108 should also position itself based on these coordinates. In coordination with the satellite 602 making its orbit over a spot to be measured, the movable sensor 108 should mirror the orbit of the satellite 602 in order to measure the same spot. As a result, the measurement device 200 should make measurements on the ground that may be used in conjunction with the measurements taken by the satellite 602 or which may be used to correct the measurements taken by the satellite 602 and help with calibrating the sensors on the satellite 602. It is also understood that the measurement device 200 may be used in a similar fashion with other overhead sensors mounted on other devices such as an airplane or a spacecraft.

The data measured by the measurement device 200 may be communicated to a ground remote device 604 via the connector device 110. Additionally, the ground remote device 604 may pick up the measurement device 200 and move it to a new location in order to take more measurements. The ground remote device 604 may be a NASA Mars Rover, or another suitable device.

It is understood by one of ordinary skill in the art that the measurement device 200 may be used on Mars, or on the Earth, or any other suitable planetary surface. The measurement device 200 may also be used on any other surface where it is desired that measurements be taken.

In operation, the illustrative embodiments described above take measurements of various points within the area encompassed by the horizontal track and the hemispherical track. One of ordinary skill in the art would also understand that illustrative embodiments of the measurement device could also be used to take measurements of various points not within the area encompassed by the horizontal track and the hemispherical track. One way this could be accomplished would be to rotate the movable sensor unit to the exterior of the hemispherical track.

While various embodiments of the present invention have been described above, it should be understood that they have been presented by way of example, and not limitation. It will be apparent to persons skilled in the relevant art that various changes in form and detail can be made therein without departing from the spirit and scope of the present invention. In fact, after reading the above description, it will be apparent to one skilled in the relevant art how to implement the invention in alternative embodiments. Thus, the present invention should not be limited by any of the above described exemplary embodiments. In particular, it should be noted that, for example purposes, the above explanation has focused on the examples wherein the horizontal track is circular. However, those experienced in the art will realize that multiple other embodiments, including, but not limited to utilizing a horizontal track shaped like an oval or rectangle could be used.

In addition, it should be understood that any figures, screen shots, tables, examples, etc. which highlight the functionality and advantages of the present invention, are presented for example purposes only. The architecture of the present invention is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Furthermore, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A measurement device, comprising:
    a) a horizontal track;
    b) at least one self-leveling foot coupled to the horizontal track;
    c) a hemispherical track coupled to the horizontal track;
    d) a movable sensor unit coupled to the hemispherical track; and
    e) a connector disposed on the hemispherical track.

2. The measurement device according to claim 1, further comprising at least one stabilizer bar coupled to the horizontal track and the hemispherical track.

3. The measurement device according to claim 1, wherein the connector device comprises:
    f) a communications mechanism configured to communicate with an external device;
    g) a power mechanism configured to transmit power from an external device; and
    h) a grab point configured to allows an external device to couple to the measurement device.

4. The measurement device according to claim 1, further including a sun-seeker coupled to the movable sensor unit.

5. The measurement device according to claim 1, wherein the movable sensor unit comprises:
    i) a sensor head configured for taking measurements;
    j) a sensor angle measurement device configured to measure the position of the sensor head;
    k) a sensor head drive motor configured to move the sensor head into the correct position; and
    l) a storage device.

6. The measurement device according to claim 5, wherein the sensor head includes a thermal exitance spectral sensor.

7. The measurement device according to claim 5, wherein the sensor head includes a bidirectional reflectance sensor.

8. The measurement device according to claim 1, further including solar panels.

9. A measurement device, comprising:
    a) a horizontal track;
    b) a horizontal track guide bar disposed on the horizontal track;
    c) at least one self-leveling foot coupled to the horizontal track;
    d) a motor which rotates the horizontal track guide bar;
    e) a hemispherical track coupled to the horizontal track guide bar;
    f) a hemispherical track guide bar disposed on the hemispherical track;
    g) a movable sensor unit coupled to the hemispherical track; and
    h) a connector disposed on the hemispherical track.

10. The measurement device according to claim 9, wherein at least one stabilizer bar is coupled to the horizontal track guide bar and the hemispherical track.

11. The measurement device according to claim 9, wherein the connector device comprises:
    i) a communications mechanism configured to communicate with an external device;
    j) a power mechanism configured to receive power from an external device; and
    k) a grab point configured to allow an external device to couple to the measurement device.

12. The measurement device according to claim 9, wherein a sun-seeker is coupled to the movable sensor unit.

13. The measurement device according to claim 9, wherein the movable sensor unit comprises:
    l) a sensor head for taking measurements;
    m) a sensor angle measurement device which determine a correct position for the sensor head;
    n) a sensor head drive motor which moves the sensor head into the correct position; and
    o) a storage device which stores data.

14. The measurement device according to claim 9, wherein the sensor head comprises a thermal exitance spectral sensor.

15. The measurement device according to claim 9, wherein the sensor head comprises a bidirectional reflectance sensor.

16. The measurement device according to claim 9, wherein the horizontal track, the horizontal track guide bar, the motor, the hemispherical track and the hemispherical track guide bar comprise a goniometer.

17. The measurement device according to claim 9, further including a transmitter configured to communicate with an external device.

18. A method for collecting data to correct remote sensing system calculations, comprising:
    p) tracking an orbit of a remote sensing system with a ground based measurement device having a movable sensor unit coupled to a hemispherical track, the ground based measurement device configured to utilize the movable sensor, the movable sensor capable of collecting data related to data collected by the remote sensing system;
    q) collecting data along the orbit with the ground based measurement device; and
    r) transmitting the data to an external source in order to correct said remote sensing system calculations.

19. The method for collecting data to correct remote sensing system calculations according to claim 18, wherein the measurement device is configured to measure thermal exitance.

20. The method for collecting data to correct remote sensing system calculations according to claim 18, wherein the measurement device is configured to measure bidirectional reflectance.

* * * * *